United States Patent
Guerbuez

(10) Patent No.: US 10,655,713 B2
(45) Date of Patent: May 19, 2020

(54) DEVICE HAVING A PIVOT LEVER

(71) Applicant: Bayerische Motoren Werke Aktiengesellschaft, Munich (DE)

(72) Inventor: Osman Guerbuez, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 703 days.

(21) Appl. No.: 15/394,891

(22) Filed: Dec. 30, 2016

(65) Prior Publication Data

US 2017/0108097 A1    Apr. 20, 2017

Related U.S. Application Data

(63) Continuation of application No. PCT/EP2015/064916, filed on Jul. 1, 2015.

(30) Foreign Application Priority Data

Jul. 4, 2014  (DE) .................. 10 2014 213 041

(51) Int. Cl.
| | |
|---|---|
| *F16H 21/44* | (2006.01) |
| *B60N 2/235* | (2006.01) |
| *B60N 2/22* | (2006.01) |
| *G05G 1/02* | (2006.01) |

(52) U.S. Cl.
CPC .............. *F16H 21/44* (2013.01); *B60N 2/22* (2013.01); *B60N 2/2356* (2013.01); *G05G 1/02* (2013.01)

(58) Field of Classification Search
CPC ............. F16H 21/44; G05G 1/04; G05G 1/02
USPC ................... 74/524; 403/117; 16/429
See application file for complete search history.

(56) References Cited

U.S. PATENT DOCUMENTS

| | | | | |
|---|---|---|---|---|
| 1,300,384 | A | * | 4/1919 | Hanahan ................ G05G 1/085 74/547 |
| 3,486,397 | A | * | 12/1969 | Rest ......................... F16C 1/18 74/501.6 |
| 4,726,252 | A | * | 2/1988 | Dawson ................. B62K 23/06 188/265 |
| 6,029,535 | A | * | 2/2000 | Kenny ................ F16H 59/0278 403/349 |
| 6,298,749 | B1 | * | 10/2001 | Stroer ..................... G05G 1/04 74/524 |

(Continued)

FOREIGN PATENT DOCUMENTS

| | | |
|---|---|---|
| DE | 10 2011 085 272 A1 | 5/2013 |
| DE | 10 2012 001 276 A1 | 7/2013 |

(Continued)

OTHER PUBLICATIONS

International Search Report (PCT/ISA/210) issued in PCT Application No. PCT/EP2015/064916 dated Sep. 4, 2015 with English translation (six pages).

(Continued)

*Primary Examiner* — William C Joyce
(74) *Attorney, Agent, or Firm* — Crowell & Moring LLP

(57) ABSTRACT

A device has a pivot lever which has a first pivot arm, a second pivot arm and a joint connecting the two pivot arms to one another, wherein the two pivot arms have opposite end faces, and each end face is divided by the joint into two sections which are oriented at an obtuse angle relative to one another. The device enables a direction-dependent transmission of torque.

7 Claims, 3 Drawing Sheets

(56) References Cited

U.S. PATENT DOCUMENTS

2013/0193733 A1    8/2013  Pleskot

FOREIGN PATENT DOCUMENTS

| GB | 17173 | * | 3/1915 |
| WO | WO 83/04078 A1 | | 11/1983 |

OTHER PUBLICATIONS

German-language Written Opinion (PCT/ISA/237) issued in PCT Application No. PCT/EP2015/064916 dated Sep. 4, 2015 (five pages).
German Search Report issued in counterpart German Application No. 10 2014 213 041.7 dated Jun. 11, 2015 with partial English translation (12 pages).

* cited by examiner

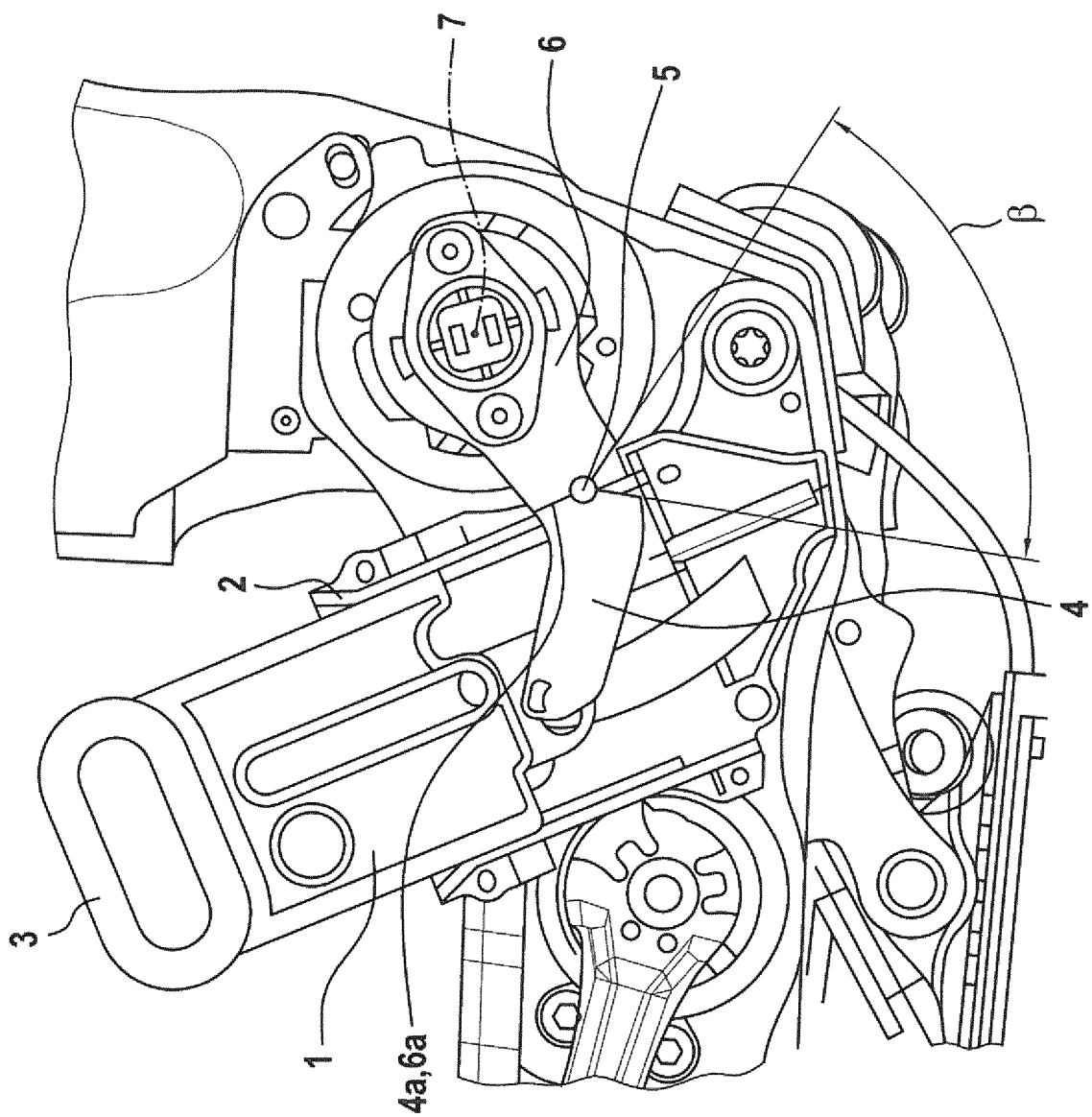

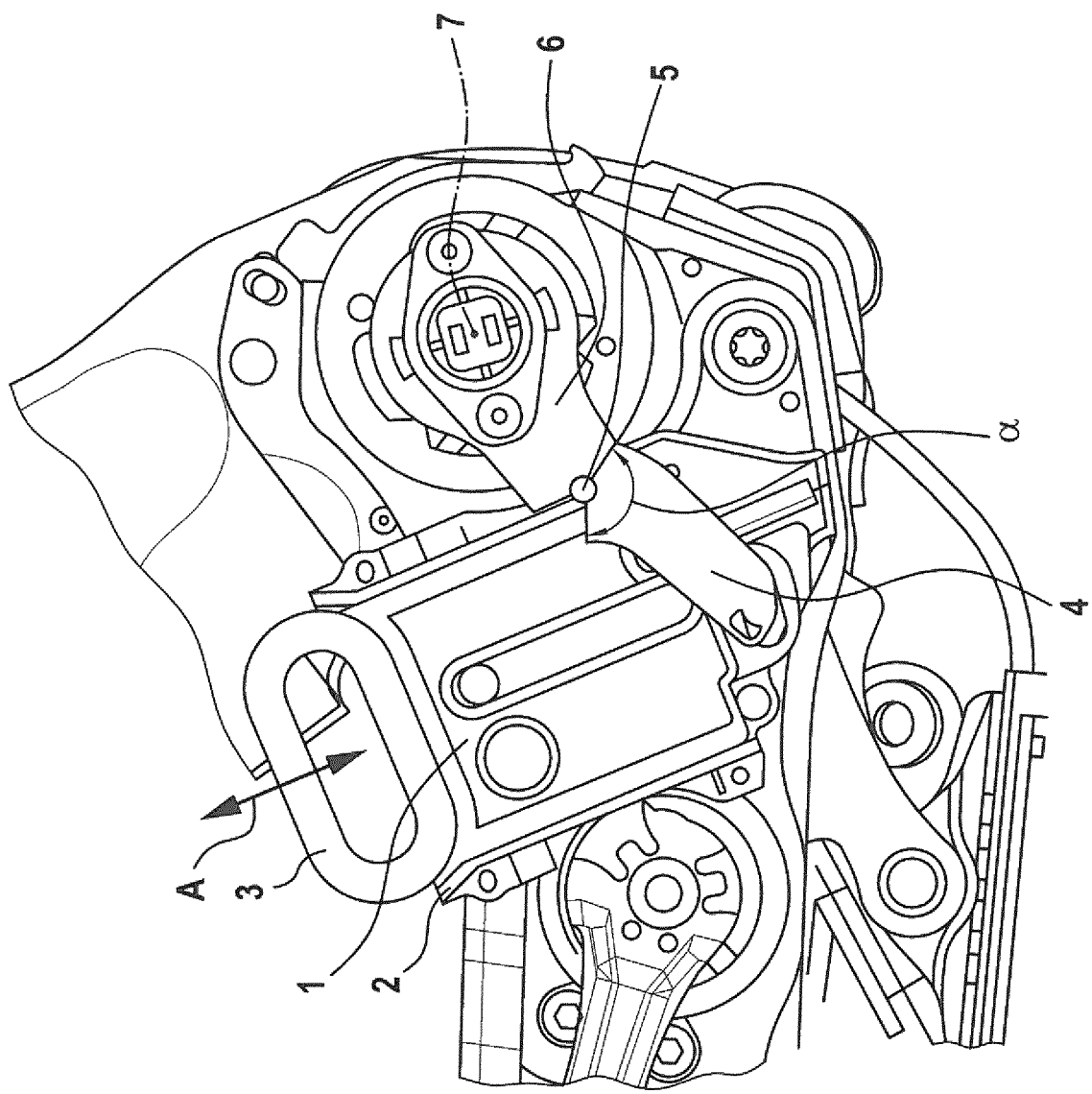

DEVICE HAVING A PIVOT LEVER

CROSS REFERENCE TO RELATED APPLICATIONS

This application is a continuation of PCT International Application No. PCT/EP2015/064916, filed Jul. 1, 2015, which claims priority under 35 U.S.C. § 119 from German Patent Application No. 10 2014 213 041.7, filed Jul. 4, 2014, the entire disclosures of which are herein expressly incorporated by reference.

BACKGROUND AND SUMMARY OF THE INVENTION

The invention relates to a device having a pivot lever.

Devices having a pivot lever are well known in the prior art. In the field of motor vehicles, for example, they are used in kinematic adjustment systems, such as a seat height adjustment device, a backrest inclination adjustment device, a seat inclination adjustment device, etc., or when the aim is to convert a linear movement into a rotational movement. Here, the pivot levers are, as a rule, configured as single-piece levers. This produces the disadvantage, however, that no direction-dependent torque transmission is possible, since every movement of the pivot lever is transmitted directly as a consequence of its single-piece configuration. This is unfavorable in many cases, however, if, for example, a torque transmission is desired only in one direction.

It is therefore an object of the present invention to provide a device having a pivot lever, which device permits a direction-dependent torque transmission.

This and other objects are achieved according to the invention by way of a device having a pivot lever which has a first pivoting arm, a second pivoting arm and a joint which connects the two pivoting arms to one another. The two pivoting arms have end sides which lie opposite one another. Each end side is divided by way of the joint into two sections which are oriented at an obtuse angle with respect to one another.

As a consequence of the configuration according to the invention, any desired direction-dependent torque transmission can be realized depending on the configuration of the angle between the two sections.

According to one preferred development, the sections which lie opposite one another of the two pivoting arms run parallel to one another on a first side of the joint, whereas the sections which lie opposite one another of the two pivoting arms enclose a clearance angle between them on a second side of the joint. This leads to a pivoting movement of the first pivoting arm in a first direction being transmitted directly to the second pivoting arm, whereas a pivoting movement of the first pivoting arm in a second direction which is opposed to the first direction is transmitted to the second pivoting arm only after the clearance angle is overcome. Depending on the magnitude of the clearance angle, a situation can therefore be achieved where a torque or a pivoting movement of the first pivoting arm is transmitted to the second pivoting arm only in a delayed manner or else not at all.

According to one alternative embodiment, the sections which lie opposite one another of the two pivoting arms enclose a clearance angle between them on both sides of the joint. This arrangement leads to a pivoting movement of the first pivoting arm in the first direction being transmitted only in a delayed manner to the second pivoting arm, whereas, in the case of a pivoting movement of the first pivoting arm in the second direction, the torque is transmitted to the second pivoting arm in a delayed manner or else not at all, depending on the magnitude of the clearance angle.

The first pivoting arm is advantageously connected to a linearly guided pull handle at its end which faces away from the joint. The second pivoting arm is preferably fastened to a rotational axis at its end which faces away from the joint. Here, a linear movement of the pull handle advantageously brings about a pivoting movement at least of the first pivoting arm. It is possible with the aid of said arrangement to transfer a linear movement of the pull handle into a rotational movement of the pivot lever and/or the pivot axis.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is a schematic diagram showing the device in a first position.

FIG. 3 is a schematic diagram showing the device in a second position.

DETAILED DESCRIPTION OF THE DRAWINGS

Figure 1:
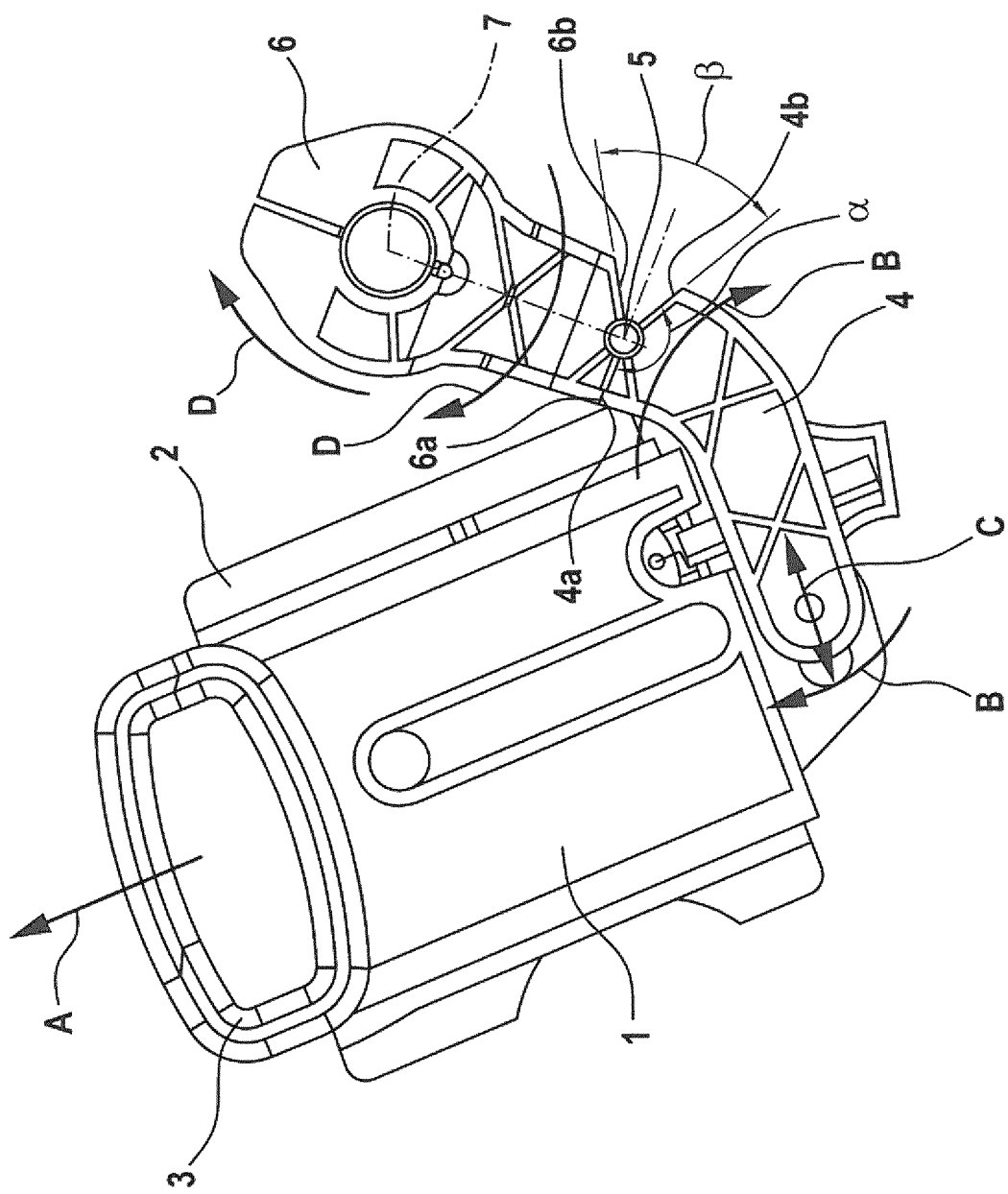
FIG. 1 is a schematic diagram an outline view of the device according to an embodiment of the invention.

In the figures, the device is described and explained using the example of a vehicle seat with an entry aid for rear passengers.

A pull handle 1 which is guided in a linear guide 2 is mounted on a vehicle seat. The pull handle 1 has a handle 3 at its one end. At its end which lies opposite the handle 3, the pull handle 1 is connected to a first pivoting arm 4 of a pivot lever in such a way that a movement of the pull handle 1 in the direction of the arrow A (upward in FIG. 1) leads to a pivoting movement of the first pivoting arm 4 in a first direction according to the arrows B (in the clockwise direction). Here, the bearing point of the first pivoting arm 4 on the pull handle 1 can move in the direction of the double arrow C in a slot of the pull handle 1.

The first pivoting arm 4 is connected via a joint 5 to a second pivoting arm 6 which is coupled on its end which faces away from the joint 5 to a rotational axis 7.

The two pivoting arms 4, 6 have end sides which lie opposite one another, and each end side is divided by way of the joint 5 into two sections 4a, 4b and 6a, 6b which are oriented in each case at an obtuse angle α (FIG. 1 and FIG. 3) with respect to one another.

In the exemplary embodiment which is shown in FIG. 1, the sections 4a and 6a which lie opposite one another of the two pivoting arms 4, 6 run parallel to one another on a first side of the joint 5, whereas the sections 4b and 6b which lie opposite one another of the two pivoting arms 4, 6 enclose a clearance angle β (FIG. 1 and FIG. 2) between them on a second side of the joint 5.

As a consequence of this configuration, a pivoting movement of the first pivoting arm 4 in the direction of the arrows B is transmitted directly to the second pivoting arm 6 which is then pivoted in the direction of the arrows D (in the clockwise direction).

FIG. 1 shows a position, in which the pull lever handle 1 is situated in a lower position. If the pull handle 1 is then pulled out of the position which is shown in FIG. 1 into the upper position which is shown in FIG. 2, the first pivoting arm 4 is pivoted in the direction of the arrows B. Since the sections 4*a*, 6*a* which lie opposite one another of the two pivoting arms 4, 6 run parallel to one another on the first side of the joint 5, a pivoting movement of the first pivoting arm 4 is transmitted directly into a pivoting movement of the second pivoting arm 6 in the direction of the arrows D. As a result, the rotational axis 7 can be pivoted and, for example, a mechanism for unlocking a backrest can be released.

If the pull handle 1 is then transferred again into its lower position which is shown in FIG. 3, the first pivoting arm 4 is pivoted counter to the direction of the arrows B (in the counterclockwise direction). Here, the sections 4*a*, 6*a* which lie opposite one another of the two pivoting arms 4, 6 move away from one another on the first side of the joint 5, whereas the sections 4*b*, 6*b* which lie opposite one another of the two pivoting arms 4, 6 approach one another on the second side of the joint 5 (FIG. 3).

The magnitude of the clearance angle β can be used to set whether the pivoting movement of the first pivoting arm 4 is to be transmitted to the second pivoting arm 6 at all or only in a delayed manner.

As an alternative to the embodiment which is shown in the figures, the sections 4*a*, 6*a* which lie opposite one another on the first side of the joint 5 can also enclose a clearance angle between them, with the result that there is then a clearance angle between the sections 4*a*, 6*a* and 4*b*, 6*b* which lie opposite one another of the two pivoting arms 4, 5 on both sides of the joint 5. If this is the case, a pivoting movement of the first pivoting arm 5 in the direction of the arrows B is also transmitted to the second pivoting arm 6 only in a manner which is more or less delayed, depending on the magnitude of the clearance angle.

LIST OF DESIGNATIONS

1 Pull handle
2 Linear guide
3 Handle
4 First pivoting arm
5 Joint
6 Second pivoting arm
7 Rotational axis
A Arrow
B Arrow
C Arrow
D Arrow
α Obtuse angle
β Clearance angle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device, comprising:
   a pivot lever having a first pivoting arm, a second pivoting arm and a joint which connects the first and second pivoting arms to one another, wherein
   the first and second pivoting arms have end sides which lie opposite one another,
   each end side is divided by way of the joint into two sections which are oriented at an obtuse angle with respect to one another, and
   the first pivoting arm is connected to a linearly guided pull handle at an end which faces away from the joint.

2. The device as claimed in claim 1, wherein
   the sections which lie opposite one another of the first and second pivoting arms run parallel to one another on a first side of the joint, and
   the sections which lie opposite one another of the first and second pivoting arms enclose a clearance angle between them on a second side of the joint.

3. The device as claimed in claim 2, wherein the second pivoting arm is fastened to a rotational axis at an end which faces away from the joint.

4. The device as claimed in claim 1, wherein the sections which lie opposite one another of the first and second pivoting arms enclose a clearance angle between them on both sides of the joint.

5. The device as claimed in claim 4, wherein the second pivoting arm is fastened to a rotational axis at an end which faces away from the joint.

6. The device as claimed in claim 1, wherein the second pivoting arm is fastened to a rotational axis at an end which faces away from the joint.

7. The device as claimed in claim 1, wherein a linear movement of the linearly guided pull handle brings about a pivoting movement at least of the first pivoting arm.

* * * * *